United States Patent [19]
Touval et al.

[11] 3,888,820
[45] June 10, 1975

[54] NOVEL FLAME RETARDANT COMPOSITIONS OF MATTER

[75] Inventors: Irving Touval, Fords; Morris Dunkel, Paramus, both of N.J.

[73] Assignee: Universal Oil Products Company, Des Plaines, Ill.

[22] Filed: Dec. 20, 1972

[21] Appl. No.: 316,942

[52] U.S. Cl..................260/45.7 R; 260/45.75 B; 260/45.75 K
[51] Int. Cl............................................ C08c 11/24
[58] Field of Search . 260/45.7 R, 45.75 B, 45.75 K, 260/648 C

[56] References Cited
UNITED STATES PATENTS
3,730,940 5/1973 Versnel et al.................. 260/45.7 R
3,730,942 5/1973 Green et al..................... 260/45.7 R
3,787,356 1/1974 Gourse......................... 260/45.75 B Primary Examiner—Melvyn I. Marquis
Attorney, Agent, or Firm—James R. Hoatson, Jr.; Raymond H. Nelson; William H. Page, II

[57] ABSTRACT

Novel flame retardant compositions of matter comprising a mixture of a polymeric material and a polyhalo-substituted tricyclic compound which may contain similar or dissimilar halogen atoms. The compositions of matter are exemplified by a mixture of a polyester and 2,3-dibromo-4,5,6,7,8,8-hexachloro-3a,4,7,7a-tetrahydro-4,7-methanoindane.

7 Claims, No Drawings

NOVEL FLAME RETARDANT COMPOSITIONS OF MATTER

This invention relates to novel flame retardant compositions of matter comprising a mixture of a polymeric material and a polyhalo-substituted tricyclic compound. More particularly the invention is concerned with novel flame retardant compositions of matter comprising a mixture of a polymer and a polychloro- and/or polybromo-substituted tricyclic compound of a type hereinafter set forth in greater detail, said compositions of matter possessing desirable physical characteristics of flame retardancy and fire resistance.

Inasmuch as it is in increased use in the industrial, commercial and residential world of polymers, resins, as well as naturally occurring and synthetic fabrics and textiles, it is becoming increasingly more important that these products possess certain desirable physical characteristics. Among these desirable physical characterists are those of flameproofing and/or fire retardancy. These particular characteristics will possess special advantages when preparing plastics, polymers, resins, various rubbers, textiles, etc. which will be utilized in various places which may be subjected to excessive heat or to the action of a possible flame, such places including architectural panels for construction work, wall plugs for electrical connections, soundproofing material in walls, ceilings, etc. cushions for various vehicle seats such as airplane seats, automobile seats, bus seats, truck seats, heater ducts, cable and wire coatings, TV-cabinets, appliance housings, etc. In addition, it is also desirable for various paints, lacquers, varnishes, protective coatings, films, etc. who also possess the aforesaid desirable physical characteristics of being flame retardant or flameproof. In order to render these articles of commerce fire retardant, it is necessary to incorporate therein as one component thereof a compound which possesses this characteristic. It is known that compounds that contain chlorine or bromine substituents possess this characteristic and therefore it has been found that compounds of the type hereinafter set forth in greater detail may be utilized as one component when preparing these compositions of matter. The polyhalosubstituted compounds of the present invention are useful as additives to plastics, polymers, copolymers, terpolymers, resins, polycondensates, elastomers, rubbers, textiles and fibers, wood and paper, both naturally occurring and synthetic in nature, coatings, paints, varnishes, leather, foams, cellulose acetate butyrate, ethyl cellulose, cellulose propionate, polyolefins such as polyethylene and polyethylene copolymers, synthetic polyethylene paper, polypropylene and polypropylene copolymers, polystyrenes, polystyrene copolymers, polyvinyl acetate or alcohol and copolymers, polyvinyl chloride and copolymers, polyvinylidene chloride and copolymers, polyesters, polyurethane, polyphenyl ethers, styrenated polyesters, polycarbonates, polyamides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadiene-styrene formulations (commonly known as ABS), polybutylene and acrylic ester-modified-styrene acrylonitrile (ASA), etc., whereby the desirable physical characteristics of flameproofing or fire retardancy will be imparted to the aforementioned materials. By utilizing the compounds of the present invention, a catalytic and/or synergistic action in which the fire retardance or flameproofing will be greatly enhanced will occur. In addition, besides imparting the desirable physical characteristics of flame retardancy to the various articles of manufacture, the additives will also exhibit an unexpected color stability which will render certain polymeric materials more stable to color changes and therefore will be important components of these compositions of matter whenever it is desirable that discoloration of the finished product is to be avoided or will tend to render such articles unusable. This color stability is unexpected inasmuch as many bromine-containing compounds, and especially brominated aliphatic compounds, will tend to deteriorate, thus releasing bromine which subsequently results in a discoloration of the polymeric product.

It is therefore an object of this invention to provide novel compositions of matter possessing desirable physical characteristics.

A further object of this invention is to prepare novel compositions of matter in which one component thereof contains a plurality of halogen substituents such as chlorine or bromine which will permit the final composition of matter to be used in finished articles of commerce whereby the desirable physical characteristics of flameproofing or fire retardancy is a necessary prerequisite for its use.

In one aspect an embodiment of this invention resides in a novel flame retardant composition of matter comprising a polymeric material and a compound possessing the formula:

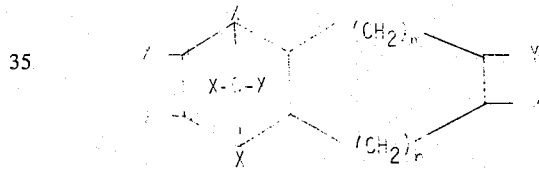

in which X is selected from the group consisting of hydrogen and halogen, at least two X's being halogen, Y is halogen, $m$ ranges from 0 to 2, and $n$ is an integer of from 1 to 2.

A specific embodiment of this invention is found in a flame retardant composition of matter comprising a mixture of a polyester and 2,3-dibromo-4,5,6,7,8,8-hexachloro-3a,4,7,7a-tetrahydro-4,7-methanoindane.

Other objects and embodiments will be found in the following further detailed description of the present invention.

As hereinbefore set forth the present invention relates to novel flame retardant compositions of matter comprising a mixture of a polymeric material and a polyhalo-substituted tricyclic compound. The latter compound which is used as one component of the mixture will possess the generic formula:

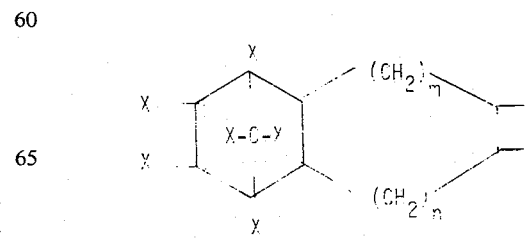

in which X is selected from the group consisting of hydrogen and halogen, at least two X's being halogen, Y is halogen, $m$ ranges from 0 to 2, and $n$ is an integer of from 1 to 2.

These compounds are prepared by condensing a polyhalo-substituted conjugated cycloalkadiene such as a polyhalo-substituted 1,3-cyclopentadiene, hereinafter referred to as cyclopentadiene, with a cycloalkadiene containing from five up to about eight carbon atoms in the ring, the unsubstituted cycloalkadienes being either conjugated or non-conjugated in configuration. Examples of the polyhalo-substituted cycloalkadiene which may be used will include 1,2-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene, etc. Examples of cycloalkadienes which may be condensed with the aforementioned polyhalo-substituted cyclopentadienes will include cyclopentadiene, 1,3-cyclohexadiene, 1,4-cyclohexadiene, 1,3-cycloheptadiene, 1,4-cycloheptadiene, 1,3-cyclooctadiene, 1,4-cyclooctadiene, 1,5-cyclooctadiene, etc.

The reaction between the aforementioned compounds is effected in a Diels-Alder manner, usually being effected at elevated temperatures ranging from about 40° up to about 200° C. or more. In the preferred embodiment of the invention the reaction is effected at atmospheric pressures, however, it is also contemplated within the scope of this invention, that superatmospheric pressures may also be employed, said superatmospheric pressures ranging from 2 up to about 100 atmospheres and being afforded by the introduction of an inert gas such as nitrogen, argon, etc. into the reaction zone. The amount of pressure which is employed will be that which is sufficient to maintain a major portions of the reactants in the liquid phase. In addition, if so desired, the reaction may be carried out in a medium consisting of an inert organic solvent, said solvents including paraffins such as n-hexane, n-heptane; aromatics hydrocarbons such as benzene, toluene, the xylenes, ethylbenzene, diethylbenzene, dichlorobenzene, etc.; or ethers such as dibenzyl ether, diglyme, etc. Another reaction condition which is employed is that the polyhalo-substituted cycloalkadiene and cycloalkadiene are present in essentially an equimolar ratio, or, if so desired, the cycloalkadiene may be present in an excess over that of the polyhalo-substituted cycloalkadiene.

The condensation of the polyhalo-substituted cycloalkadiene and cycloalkadiene may be effected in any suitable manner and may comprise either a batch or continuous type operation. When a batch type operation is used, a quantity of the starting material, namely, the polyhalo-substituted cycloalkadiene and the cycloalkadiene along with an inert solvent, if so desired, is placed in an appropriate condensation apparatus provided with stirring and heating means. The reaction vessel is then heated to the desired temperature and maintained thereat for a predetermined period of time which may range from about 0.5 up to about 12 hours or more in duration. At the end of this time, the reaction vessel and contents thereof are cooled to room temperature and the reaction product is separated from the solvent, any unreacted starting materials and unwanted side products by conventional means which may include washing, drying, extraction, fractional distillation, etc.

In addition, it is also contemplated that the condensation reaction may be effected in a continuous manner. When this type of operation is employed, the starting materials are continuously charged to a reaction vessel which is maintained at the proper operating conditions of temperature and pressure. In addition, if an inert organic solvent is to be utilized, the solvent is also continuously charged to the reaction zone through a separate line or, if so desired, it may be admixed with one or both of the starting materials and the resulting mixture charged thereto in a single stream. Upon completion of the desired residence time in the reactor, the reactor effluent is continuously withdrawn. The thus withdrawn condensation product is separated from any unreacted starting materials and solvent and purified by conventional means similar to those hereinbefore set forth while the unreacted starting materials and solvent are recycled to the reactor for further action as a portion of the feed material.

The condensation product between the polyhalo-substituted cycloalkadiene and the cycloalkadiene is then halogenated with a halogenating agent in which the halogen is dissimilar from the halogen which is present in the aforementioned condensation product. The polyhalo-substituted tricyclic compound is subjected to halogenation at conditions which include temperatures ranging from about 0° up to about 50° C. or more, the particular temperature being dependent upon the halogenating agent which is utilized to effect the reaction. Examples of halogenating agents which may be used include elemental chlorine when the polyhalo-substituted tricyclic compound contains bromine atoms on the ring or elemental bromine when the polyhalo-substituted tricyclic compound contains chlorine atoms on the ring. One such method of effecting the halogenation, and particularly bromination, is to effect the polyhalo-substituted tricyclic alkadiene and elemental bromine using a solvent such as carbon tetrachloride, chloroform, etc., the reactants usually being utilized in equimolar proportions. Upon completion of the addition of the halogen with further stirring for a period of time ranging from 0.5 up to about 10 hours or more in duration, the apparatus is allowed to return to room temperature, the reaction mixture is recovered and again subjected to conventional means of separation whereby the desired polyhalo-substituted tricyclic alkene in which the halogen substituents are preferably dissimilar in nature is recovered. As in the case of the condensation between the polyhalo-substituted cycloalkadiene and the cycloalkadiene the halogenation of the tricyclic alkadiene may be accomplished in either a batch or continuous type operation.

Examples of polyhalo-substituted tricyclic alkenes which may be used as one of the components of the novel flame retardant composition of matter of the present invention will possess the generic formula:

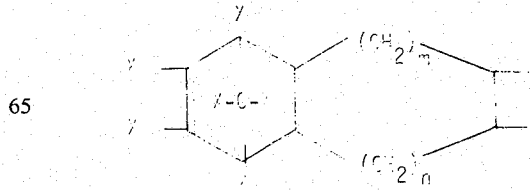

in which X is selected from the group consisting of hydrogen and halogen, at least two X's being halogen, Y is halogen, $m$ ranges from 0 to 2 and $n$ is an integer of from 1 to 2. Some specific examples of these will include 2,3-dibromo-4,5-dichloro-3a,4,7,7a-tetrahydro-4,7-methanoindane, 2,3-dibromo-4,5,6-trichloro-3a,4,7,7a-tetrahydro-4,7-methanoindane, 2,3-dibromo-4,5,6,7-tetrachloro-32,4,7,7a-tetrahydro-4,7-methanoindane, 2,3-dibromo-4,5,6,7,8,8-hexachloro-3a,4,7,7a-tetrahydro-4,7-methanoindane, 2,3-dichloro-4,5,6,7-tetrabromo-3a,4,7,7a-tetrahydro-4,7-methanoindane, 2,3-dichloro-4,5,6,7,8,8-hexabromo-3a,4,7,7a-tetrahydro-4,7-methanoindane, 1,2-dichloro-6,7-dibromo-1,4,4a,5,6,7,8,8a-octahydro-1,4-methanonaphthalene, 1,2,3-trichloro-6,7-dibromo-1,4,4a,5,6,7,8,8a-octahydro-1,4-methanonaphthalene, 1,2,3,4-tetrachloro-6,7-dibromo-1,4,4a,5,6,7,8,8a-octahydro-1,4-methanonaphthalene, 1,2,3,4,9,9-hexachloro-6,7-dibromo-1,4,4a,5,6,7,8,8a-octahydro-1,4-methanonaphthalene, 1,2-dibromo-6,7-dichloro-1,4,4a,5,6,7,8,8a-octahydro-1,4-methanonaphthalene, 1,2,3,4-tetrabromo-6,7-dichloro-1,4,4a,5,6,7,8,8a-octahydro-1,4-methanonaphthalene, 1,2,3,4,9,9-hexabromo-6,7-dichloro-1,4,4a,5,6,7,8,8a-octahydro-1,4-methanonaphthalene, 1,2-dichloro-6,7-dibromo-1,4,4a,9a-tetrahydro-1,4-methano-1H-benzocycloheptane, 1,2,3-trichloro-6,7-dibromo-1,4,4a,9a-tetrahydro-1,4-methano-1H-benzocycloheptane, 1,2,3,4-tetrachloro-6,7-dibromo-1,4,4a,9a-tetrahydro-1,4-methano-1H-benzocycloheptane, 1,2,3,4,10,10-hexachloro-6,7-dibromo-1,4,4a,9a-tetrahydro-1,4-methano-1H-benzocycloheptane, 1,2-dibromo-6,7-dichloro-1,4,4a,9a-tetrahydro-1,4-methano-1H-benzocycloheptane, 1,2,3-tribromo-6,7-dichloro-1,4,4a,9a-tetrahydro-1,4-methano-1H-benzocycloheptane, 1,2,3,4-tetrabromo-6,7-dichloro-1,4,4a,9a-tetrahydro-1,4-methano-1H-benzocycloheptane, 1,2,3,4,10,10-hexabromo-6,7-dichloro-1,4,4a,9a-tetrahydro-1,4-methano-1H-benzocycloheptane, 1,2-dichloro-6,7-dibromo-1,4,4a,10a-tetrahydro-1,4-methanobenzocyclooctane, 1,2,3-trichloro-6,7-dibromo-1,4,4a,10a-tetrahydro-1,4-methanobenzocyclooctane, 1,2,3,4-tetrachloro-6,7-dibromo-1,4,4a,10a-tetrahydro-1,4-methanobenzocyclooctane, 1,2,3,4,11,11-hexachloro-7,8-dibromo-1,4,4a,10a-tetrahydro-1,4-methanobenzocyclooctane, 1,2-dibromo-7,8-dichloro-1,4,4a,10a-tetrahydro-1,4-methanobenzocyclooctane, 1,2,3-tribromo-7,8-dichloro-1,4,4a,10a-tetrahydro-1,4-methanobenzocyclooctane, 1,2,3,4-tetrabromo-7,8-dichloro-1,4,4a,10a-tetrahydro-1,4-methanobenzocyclooctane, 1,2,3,4,11,11-hexabromo-7,8-dichloro-1,4,4a,10a-tetrahydro-1,4-methanobenzocyclooctane, etc. It is to be understood that the aforementioned polyhalo-substituted tricyclic alkenes are only representative of the class of compounds which may be used as one component of the novel composition of matter, and that the present invention is not necessarily limited thereto.

The aforementioned polyhalo-substituted tricyclic alkenes may be composited with polymeric compounds of the type hereinbefore set forth to form novel compositions of matter, said polymeric compounds comprising plastics, resins, polymers, copolymers, textiles, etc. For example, the novel compounds comprising polyhalo-substituted tricyclic compounds may be used as additives to polyolefins such as polypropylene whereby the final product will possess advantageous physical properties such as an increased stability against deterioration, weathering and aging which has been induced by chemical, physical or biological agents or radiation. In addition, the polyolefins will also possess a high ignition point as well as a high degree of flame retardancy. The alkenes may be added to the polyolefins such as polyethylene, polypropylene in a range of from about 5 to about 50% by weight of the polymeric material to be treated. Thereafter, it will be found that the oxygen index of the polyolefins will have been increased, while the burning rate will be decreased. Examples of other polymeric products which may be treated with the novel compounds of the present invention will include epoxy resins such as the condensation product of epichlorhydrin with bisphenol-A. The epoxy resins in an uncured state will usually be thermoplastic and may range from low viscosity liquids to high melting point brittle solids. These resins may be cured by mixing the alkene of the present invention with said resin and thereafter curing the mixture by treatment at an elevated temperature for a predetermined period of time. The resultant product will have the physical characteristics thereof altered to their desirable values as pertains to color stability and flame retardancy and thus may be utilized for various purposes such as floor, wall or ceiling surfacings, as coatings, etc. In addition, some other types of polymeric compounds which may be treated with the novel compounds of the present invention will include polyphenyl ethers which have been extended by treatment with styrene, polycarbonates, polyesters, polyurethane foams, etc. The admixing of the novel alkenes of the present invention with the aforementioned polymers may be accomplished by any means known in the art such as for example by admixing the compounds in a mixer, by milling the components, or by extruding the components through a suitable apparatus after admixture thereof, the only cirterion being that the two components of the mixture are thoroughly admixed in such a fashion so that the components are uniformly distributed through the finished product.

It is also contemplated within the scope of this invention that the novel compositions of matter of the present invention which comprise a polymeric material and the particular alkene may also contain a sufficient amount of a tin- and/or antimony-containing compound which will act as a synergist for the flame retardant property of said finished composition of matter by enhancing this desirable characteristic. Some specific examples of the tin and antimony compounds which may be used will include tin compounds in a tetravalent state such as tin dioxide, tin tetrachloride, methyl tin trichloride, ethyl tin trichloride, butyl tin dichloride, dipropyl tin dichloride, trimethyl tin chloride, methyl tin triacetate, dipropyl tin diacetate, diethyl tin dipropionate, diethyl tin dimaleate, dibutyl tin dimaleate, dibenzyl tin dichloride, dimethyl tin sulfide, diethyl tin sulfide, dimethyl tin bis(methylmercaptide), dibutyl tin bis(octylmercaptide), diethoxy tin bis(ethylmercaptide), tin tetrakis(methylmercaptide), diethyl tin mercaptoacetate, dioctyl tin mercaptoacetate, dilauryl tin dithiobutyric acid ethyl ether, diethyl tin S,S'-bis(3,5,5- trimethylhexylmercaptoacetate), dibutyl tin S,S'-bis(phenoxyethylmercaptoacetate), dibutyl tin S,S'-bis(diethylene glycol laurate mercaptoacetate), antimony trioxide, antimony oxychloride, etc.

Examples of novel compositions of matter comprising a mixture of a polymeric material and a polyhalosubstituted tricyclic alkene will include a mixture of polypropylene and 2,3-dibromo-4,5,6,7-tetrachloro-3a,4,7,7a-tetrahydro-4,7-methanoindane, polypropylene and 2,3-dibromo-4,5,6,7,8,8-hexachloro-3a,4,7,7a-tetrahydro-4,7-methanoindane, polypropylene and 2,3-dichloro-4,5,6,7-tetrabromo-3a,4,7,7a-tetrahydro-4,7-methanoindane, polypropylene and 2,3-dichloro-4,5,6,7,8,8-hexabromo-3a,4,7,7a-tetrahydro-4,7-methanoindane, polypropylene and 1,2,3-trichloro-6,7-dibromo-1,4,4a,5,6,7,8,8a-octahydro-1,4-methanonaphthalene, polypropylene and 1,2,3,4-tetrachloro-6,7-dibromo-1,4,4a,5,6,7,8,8a-octahydro-1,4-methanonaphthalene, polypropylene and 1,2,3,4,9,9-hexachloro-6,7-dibromo-1,4,4a,5,6,7,8,8a-octahydro-1,4-methanonaphthalene, polypropylene and 1,2,3,4,9,9-hexabromo-6,7-dichloro-1,4,4a,5,6,7,8,8a-octahydro-1,4-methanonaphthalene, polypropylene and 1,2,3,4-tetrachloro-6,7-dibromo-1,4,4a,9a-tetrahydro-1,4-methano-1H-benzocycloheptane, polypropylene and 1,2,3,4,10,10-hexachloro-6,7-dibromo-1,4,4a,9a-tetrahydro-1,4-methano-1H-benzocycloheptane, polypropylene and 1,2,3-tribromo-6,7-dichloro-1,4,4a,9a-tetrahydro-1,4-methano-1H-benzocycloheptane, polypropylene and 1,2,3,4,10,10-hexabromo-6,7-dichloro-1,4,4a,9a-tetrahydro-1,4-methano-1H-benzocycloheptane, polypropylene and 1,2-dichloro-6,7-dibromo-1,4,4a,10a-tetrahydro-1,4-methanobenzocyclooctane, polypropylene and 1,2,3,4-tetrachloro-6,7-dibromo-1,4,4a,10a-tetrahydro-1,4-methanobenzocyclooctane, polypropylene and 1,2,3,4,11,11-hexachloro-6,7-dibromo-1,4,4a,10a-tetrahydro-1,4-methanobenzocyclocthane, polypropylene and 1,2,3,4,11,11-hexabromo-7,8-dichloro-1,4,4a,10a-tetrahydro-1,4-methanobenzocyclooctane, polyethylene and 2,3-dibromo-4,5,6,7-tetrachloro-3a,4,7,7a-tetrahydro-4,7-methanoindane, polyethylene and 2,3-dibromo-4,5,6,7,8,8-hexachloro-3a,4,7,7a-tetrahydro-4,7-methanoindane, polyethylene and 2,3-dichloro-4,5,6,7-tetrabromo-3a,4,7,7a-tetrahydro-4,7-methanoindane, polyethylene and 2,3-dichloro-4,5,6,7,8,8-hexabromo-3a,4,7,7a-tetrahydro-4,7-methanoindane, polyethylene and 1,2,3-trichloro-6,7-dibromo-1,4,4a,5,6,7,8,8a-octahydro-1,4-methanonaphthalene, polyethylene and 1,2,3,4-tetrachloro-6,7-dibromo-1,4,4a,5,6,7,8,8a-octahydro-1,4-methanonaphthalene, polyethylene and 1,2,3,4,9,9-hexachloro-6,7-dibromo-1,4,4a,5,6,7,8,8a-octahydro-1,4-methanonaphthalene, polyethylene and 1,2,3,4,9,9-hexabromo-6,7-dichloro-1,4,4a,5,6,7,8,8a-octahydro-1,4-methanonaphthalene, polyethylene and 1,2,3,4-tetrachloro-6,7-dibromo-1,4,4a,9a-tetrahydro-1,4-methano-1H-benzocycloheptane, polyethylene and 1,2,3,4,10,10-hexachloro-6,7-dibromo-1,4,4a,9a-tetrahydro-1,4-methano-1H-benzocycloheptane, polyethylene and 1,2-dichloro-6,7-dibromo-1,4,4a,10a-tetrahydro-1,4-methanobenzocyclooctane, polyethylene and 1,2,3,4-tetrachloro-6,7-dibromo-1,4,4a,10a-tetrahydro-1,4-methanobenzocyclooctane, polyethylene and 1,2,3,4,11,11-hexachloro-6,7-dibromo-1,4,4a,10a-tetrahydro-1,4-methanobenzocyclooctane, polyethylene and 1,2,3,4,11,11-hexabromo-7,8-dichloro-1,4,4a,10a-tetrahydro-1,4-methanobenzocyclooctane, ABS and 2,3-dibromo-4,5,6,7-tetrachloro-3a,4,7,7a-tetrahydro-4,7-methanoindane, ABS and 2,3-dibromo-4,5,6,7,8,8-hexachloro-3a,4,7,7a-tetrahydro-4,7-methanoindane, ABS and 2,3-dichloro-4,5,6,7-tetrabromo-3a,4,7,7a-tetrahydro-4,7-methanoindane, ABS and 2,3-dichloro-4,5,6,7,8,8-hexabromo-3a,4,7,7a-tetrahydro-4,7-methanoindane, ABS and 1,2,3-trichloro-6,7-dibromo-1,4,4a,5,6,7,8,8a-octahydro-1,4-methanonaphthalene, ABS and 1,2,3,4-tetrachloro-6,7-dibromo-1,4,4a,5,6,7,8,8a-octahydro-1,4-methanonaphthalene, ABS and 1,2,3,4,9,9-hexachloro-6,7-dibromo-1,4,4a,5,6,7,8,8a-octahydro-1,4-methanonaphthalene, ABS and 1,2,3,4,9,9-hexabromo-6,7-dichloro-1,4,4a,5,6,7,8,8a-octahydro-1,4-methanonaphthalene, ABS and 1,2,3,4-tetrachloro-6,7-dibromo-1,4,4a,9a-tetrahydro-1,4-methano-1H-benzocycloheptane, ABS and 1,2,3,4,10,10-hexachloro-6,7-dibromo-1,4,4a,9a-tetrahydro-1,4-methano-1H-benzocycloheptane, ABS and 1,2,3-tribromo-6,7-dichloro-1,4,4a,9a-tetrahydro-1,4-methano-1H-benzocycloheptane, ABS and 1,2,3,4,10,10-hexabromo-6,7-dichloro-1,4,4a,9a-tetrahydro-1,4-methano-1H-benzocycloheptane, ABS and 1,2-dichloro-6,7-dibromo-1,4,4a,10a-tetrahydro-1,4-methanobenzocyclooctane, ABS and 1,2,3,4-tetrachloro-6,7-dibromo-1,4,4a,10a-tetrahydro-1,4-methanobenzocyclooctane, ABS and 1,2,3,4,11,11-hexabromo-7,8-dichloro-1,4,4a,10a-tetrahydro-1,4-methanobenzocyclooctane, styrenated polyester and 2,3-dibromo-4,5,6,7-tetrachloro-3a,4,7,7a-tetrahydro-4,7-methanoindane, styrenated polyester and 2,3-dibromo-4,5,6-7,8,8-hexachloro-3a,4,7,7a-tetrahydro-4,7-methanoindane, styrenated polyester and 2,3-dichloro-4,5,6,7-tetrabromo-3a,4,7,7a-tetrahydro-4,7-methanoindane, styrenated polyester and 2,3-dichloro-4,5,6,7,8,8-hexabromo-3a,4,7,7a-tetrahydro-4,7-methanoindane, styrenated polyester and 1,2,3-trichloro-6,7-dibromo-1,4,4a,5,6,7,8,8,a-octahydro-1,4-methanonaphthalene, styrenated polyester and 1,2,3,4-tetrachloro-6,7-dibromo-1,4,4a,5,6,7,8,8a-octahydro-1,4-methanonaphthalene, styrenated polyester and 1,2,3,4,9,9-hexachloro-6,7-dibromo-1,4,4a,5,6,7,8,8a-octahydro-1,4-methanonaphthalene, styrenated polyester and 1,2,3,4,9,9-hexabromo-6,7-dichloro-1,4,4a,5,6,7,8,8a-octahydro-1,4-methanonaphthalene, styrenated polyester and 1,2,3,4-tetrachloro-6,7-dibromo-1,4,4a,9a-tetrahydro-1,4-methano-1H-benzocycloheptane, styrenated polyester and 1,2,3,4,10,10-hexachloro-6,7-dibromo-1,4,4a,9a-tetrahydro-1,4-methano-1H-benzocycloheptane, styrenated polyester and 1,2,3-tribromo-6,7-dichloro-1,4,4a,9a-tetrahydro-1,4-methano-1H-benzocycloheptane, styrenated polyester and 1,2,3,4,10,10-hexabromo-6,7-dichloro-1,4,4a,9a-tetrahydro-1,4-methano-1H-benzocycloheptane, styrenated polyester and 1,2-dichloro-6,7-dibromo-1,4,4a,10a-tetrahydro-1,4-methanobenzocyclooctane, styrenated polyester and 1,2,3,4-tetrachloro-6,7-dibromo-1,4,4a,10a-tetrahydro-1,4-methanobenzocyclooctane, styrenated polyester and 1,2,3,4,11,11-hexachloro-6,7-dibromo-1,4,4a,10a-tetrahydro-1,4-methanobenzocyclooctane, styrenated polyester and 1,2,3,4,11,11-hexabromo-7,8-dichloro-1,4,4a,10a-tetrahydro-1,4-methanobenzocyclooctane, epoxy resin and 2,3-dibromo-4,5,6,7-tetrachloro-3a,4,7,7a- tetrahydro-4,7-methanoindane, epoxy resin and 2,3-dibromo-4,5,6,7,8,8-hexachloro-3a,4,7,7a-tetrahydro-4,7-methanoindane, epoxy resin and 2,3-dichloro-4,5,6,7-tetrabromo-3a,4,7,7a-tetrahydro-4,7-methanoindane, epoxy resin and 2,3-dichloro-4,5,6,7,8,8-hexabromo-3a,4,7,7a-tetrahydro-4,7-methanoindane, epoxy resin and 1,2,3,-trichloro-6,7-dibromo-1,4,4a,5,6,7,8,8a-octahydro-1,4-methanonaphthalene, epoxy resin and 1,2,3,4-tetrachloro-6,7-dibromo-1,4,4a,5,6,7,8,8a-octahydro-1,4-methanonaphthalene, epoxy resin and 1,2,3,4,9,9-hexachloro-6,7-dibromo-1,4,4a,5,6,7,8,8a-octahydro-1,4-methanonaphthalene, epoxy resin and 1,2,3,4,9,9-hexabromo-6,7-dichloro-1,4,4a,5,6,7,8,8a-octahydro-1,4-methanonaphthalene, epoxy resin and 1,2,3,4-tetrachloro-6,7-dibromo-1,4,4a,9a-tetrahydro-1,4-methano-1H-benzocycloheptane, epoxy resin and 1,2,-3,4,10,10-hexachloro-6,7-dibromo-1,4,4a,9a-tetrahydro-1,4-methano-1H-benzocycloheptane, epoxy resin and 1,2,3-tribromo-6,7-dichloro-1,4,4a,9a-tetrahydro-1,4-methano-1H-benzocycloheptane, epoxy resin and 1,2,3,4,10,10-hexabromo-6,7-dichloro-1,4,4a,9a-tetrahydro-1,4-methano-1H-benzocycloheptane, epoxy resin and 1,2-dichloro-6,7-dibromo-1,4,4a,10a-tetrahydro-1,4-methanobenzocyclooctane, epoxy resin and 1,2,3,4-tetrachloro-6,7-dibromo-1,4,4a,10a-tetrahydro-1,4-methanobenzocyclooctane, epoxy resin and 1,2,3,4,11,11-hexachloro-6,7-dibromo-1,4,4a,10a-tetrahydro-1,4-methanobenzocyclooctane, epoxy resin and 1,2,3,-4,11,11-hexabromo-7,8-dichloro-1,4,4a,10 a-tetrahydro-1,4-methanobenzocyclooctane, polyphenyl ether and 2,3-dibromo-4,5,6,7-tetrachloro-3a,4,7,7a-tetrahydro-4,7-methanoindane, polyphenyl ether and 2,3-dibromo-4,5,6,7,8,8-hexachloro-3a,4,7,7a-tetrahydro-4,7-methanoindane, polyphenyl ether and 2,3-dichloro-4,5,6,7-tetrabromo-3a,4,7,7a-tetrahydro-4,7-methanoindane, polyphenyl ether and 2,3-dichloro-4,5,6,7,8,8-hexabromo-3a,4,7,7a-tetrahydro-4,7-methanoindane, polyphenyl ether and 1,2,3-trichloro-6,7-dibromo-1,4,4a,5,6,7,8,8a-octahydro-1,4-methanonaphthalene, polyphenyl ether and 1,2,3,4-tetrachloro-6,7-dibromo-1,4,4a,5,6,7,8,8a-octahydro-1,4-methanonaphthalene, polyphenyl ether and 1,2,3,-4,9,9-hexachloro-6,7-dibromo-1,4,4a,5,6,7,8,8a-octahydro-1,4-methanonaphthalene, polyphenyl ether and 1,2,3,4,9,9-hexabromo-1,4,4a,5,6,7,8,8a-octahydro-1,4-methanonaphthalene, polyphenyl ether and 1,2,3,4-tetrachloro-6,7-dibromo-1,4,4a,9a-tetrahydro-1,4-methano-1H-benzocycloheptane, polyphenyl ether and 1,2,3,4,10,10-hexachloro-6,7-dibromo-1,4,4a,5,6,7,8,8a-octahydro-1,4-methano-1H-benzocycloheptane, polyphenyl ether and 1,2,3-tribromo-6,7-dichloro-1,4,4a-9a-tetrahydro-1,4-methano-1H-benzocycloheptane, polyphenyl ether and 1,2,3,4,10,10-hexabromo-6,7-dichloro 1,4-methano-1H-benzocycloheptane, polyphenyl ether and 1,2-dichloro-6,7-dibromo-1,4,4a,10a-tetrahydro-1,4-methanobenzocyclooctane, polyphenyl ether and 1,2,-3,4-tetrachloro-6,7-dibromo-1,4,4a,10a-tetrahydro-1,4-methanobenzocyclooctane, polyphenyl ether and 1,2,3,4,11,11-hexachloro-6,7-dibromo-1,4,4a,10a-tetrahydro-1,4-methanobenzocyclooctane, polyphenyl ether and 1,2,3,4,11,11-hexabromo-7,8-dichloro-1,4,4a,10a-tetrahydro-1,4-methanobenzocyclooctane, etc.

The following examples are given to illustrate the novel compositions of matter of the present invention which examples, however, are not intended to limit the generally broad scope of the present invention in strict accordance therewith.

EXAMPLE I

In this example 448 grams (4.15 mole) of 1,5-cyclooctadiene and 136 grams (0.5 mole) of hexachlorocyclopentadiene were placed in a 1-liter flask provided with a stirrer, thermometer, water condenser and stopper. The mixture was refluxed at a temperature of about 145° C. for a period of about 2 hours. At the end of this time, the reaction mixture was subjected to fractional distillation and the desired product was recovered. The product which comprised 100 grams of a solid was recrystallized from a mixture of 100 cc. of hexane and 300 cc. of methyl alcohol. The crystals were filtered and dried and 47 grams of white crystals comprising 1,2,3,4,11,11-hexachloro-1,4,4a,10a-tetrahydro-1,4-methanobenzo-7-cyclooctene was recovered, the crystals having a melting point of 66°–67° C.

The 47 grams (0.124 mole) of the compound prepared according to the above paragraph was charged to a 500 ml flask provided with a stirrer, dropping funnel, thermometer and water condenser with a bubbler added thereto along with 100 cc. of chloroform. To this mixture was added 20 grams (0.130 mole) of bromine in 100 cc. of chloroform, the addition of the bromine being effected dropwise. The temperature was maintained in a range of from 16°–35° C. for a period of about 30 minutes. The mixture was continuously stirred. Thereafter the mixture was filtered and the crystals were dried. A recrystallization from chloroform was effected and the desired product comprising 1,2,3,4,11,11-hexachloro-7,8-dibromo-1,4,4a,10a-tetrahydro-1,4-methanobenzocyclooctane was recovered.

The polychloro-polybromo-substituted methanobenzocyclooctane which was prepared according to the above paragraph is admixed with a commercial polyethylene in an amount so that the finished composition of matter will contain 15% by weight of the cyclooctane. The mixture is milled for 5 minutes at an elevated temperature and thereafter extruded into strips. In addition, another set of strips is formed consisting only of the commercial polypropylene. The two sets of strips are subjected to a combustion test similar in nature to that described by C. P. Fennimore and J. F. Martin in the November, 1966 issue of *Modern Plastics*. The results of these tests will show that the novel composition of matter of the present invention comprising a mixture of polypropylene and 1,2,3,4,11,11-hexachloro-7,8-dibromo-1,4,4a,10a-tetrahydro-1,4-methanobenzocyclooctane will possess an oxygen index greater than that possessed by the polypropylene alone and in addition will also possess a slower rate of burning in inches than that of the untreated polypropylene.

EXAMPLE II

In this example 105 grams of cyclopentadiene and 385 grams of hexachlorocyclopentadiene were admixed in a flask provided with stirring and cooling means and a condenser. The reaction mixture was refluxed at a temperature of 65° C. for a period of 25 minutes using an ice bath to control the exothermicity of the reaction. After maintaining the mixture at a temperature in the range of from 110° to 114° C. for an additional period of time, the product was dissolved in 200 cc. of hot hexane. The mixture was then cooled, the solid which appeared upon cooling was filtered and vacuum dried.

The 4,5,6,7,8,8-hexachloro-3a,4,7,7a-tetrahydro-4,7-methanoindene which was prepared according to the above paragraph was recovered and the mixture of 67.6 grams of this adduct in 300 cc. of carbon tetrachloride was placed in a second reactor. Following this a total of 32 grams of bromine was slowly added to the adduct at a temperature in the range of from 30° to 40° C. during a period of 1 hour. At the end of this time, the mixture was cooled in an ice bath, the color of the solution being red. After 40 minutes of the reaction period had elapsed 400 cc. of water was added to the solution. At the end of the aforementioned 1-hour period, the organic layer was separated from the aqueous layer and evaporated. The solid material was recrystallized from methyl alcohol and vacuum dried at 60° C. to yield 59.7 grams of the desired product comprising 2,3-dibromo-4,5,6,7,8,8-hexachloro-3a,4,7,7a-tetrahydro-4,7-methanoindane.

To illustrate the flame retardant properties of the novel compositions of matter of the present invention, a polyester resin was prepared by admixing 1,068 grams of maleic anhydride, 1,628 grams of phthalic anhydride and 1,839 grams of propylene glycol according to the method set forth in *Macromolecular Synthesis*, Volume 1, page 46. The resulting resin was styrenated and 60 grams of this resin, 0.18 grams of cobalt and 9 grams of the 2,3-dibromo-4,5,6,7,8,8-hexachloro-3a,4,7,7a-tetrahydro-4,7-methanoindane were mixed. Thereafter 0.6 grams of methyl alcohol ketone peroxide was added, the mixture was aerated and cast. The mixture gelled at room temperature and was cooled by heating for 1 hour at 75° C. and 1 hour at 125° C., the resulting novel composition of matter being green in color and clear. The mixture was cut into strips and subjected to a flammability test similar in nature to that set forth by C. P. Fennimore and J. F. Martin in the November, 1966 issue of *Modern Plastics*. In addition, another strip containing only the cobalt and the styrenated polyester resin was prepared and subjected to a flammability test. The oxygen index of the untreated ester was 0.186 while the oxygen index of three samples of the novel composition of matter was 0.213, 0.224, and 0.220, an average of 0.219. It is therefore readily apparent that a novel composition of matter comprising a mixture of a polyester and 2,3-dibromo-4,5,6,7,8,8-hexachloro-3a,4,7,7a-tetrahydro-4,7-methanoindane will be vastly superior in ability to retard fire than will be an untreated polyester resin.

EXAMPLE III

To a flask provided with stirring and cooling means is added 105 grams of cyclopentadiene and 305 grams of 1,2,3,4-tetrachlorocyclopentadiene. The exothermicity of the reaction is controlled by means of an ice bath and the reaction is allowed to proceed at a temperature of about 110° C. for a period of about 30 minutes. At the end of this time, the solid is dissolved in 200 cc. of hot hexane, removed from the flask, cooled, and the precipitate which is formed is filtered and vacuum dried. The precipitate, which comprises 4,5,6,7-tetrachloro-3a,4,7,7a-tetrahydro-4,7-methanoindene, is placed in a second reactor after being dissolved in 300 cc. of carbon tetrachloride. The mixture is heated to a temperature of about 40° C. and 43 grams of bromine is slowly added to the mixture during a period of 1 hour. Midway during the addition of the bromine, 400 cc. of water is added to the solution which is thoroughly admixed. At the end of the aforementioned 1-hour period, the mixture is recovered and the organic layer is separated from the aqueous layer. The organic layer is then evaporated on a steam bath and the solid which remains is recrystallized from methyl alcohol, said crystals comprising the desired product, namely, 2,3-dibromo-4,5,6,7-tetrachloro-3a,4,7,7a-tetrahydro-4,7-methanoindane.

The polyhalo-substituted methanoindane is admixed with a styrenated polyester similar in nature to that described in Example II above. The mixture is extruded and cut into strips and subjected to a flammability test similar in nature to that also described in the above examples. This flammability test will indicate that the oxygen index of the novel composition of matter of the present invention will be greater than that which is possessed by an untreated styrenated polyester. In addition, the novel composition of matter will also have a slower burning rate as measured in inches than that of the untreated polyester.

EXAMPLE IV

To a flask provided with stirring and cooling means as well as a condenser is added 120 grams of 1,4-cyclohexadiene and 385 grams of hexachlorocyclopentadiene. The resulting mixture is allowed to react for a period of 30 minutes while controlling the temperature of the reaction by means of an ice bath. At the end of the 30-minute time period, the mixture is treated in a similar manner to that described above by being dissolved in hot hexane, removed, cooled, filtered and vacuum dried. The resulting product is then brominated by the addition of bromine during a 1-hour period at a temperature of about 40° C. After the addition of water and separation of the organic layer from the aqueous layer, the former is evaporated and the resulting solid is recrystallized from methyl alcohol.

The product which is obtained from the above reactions, namely 1,2,3,4,9,9-hexachloro-6,7-dibromo-1,4,4a,5,6,7,8,8a-octahydro-1,4-methanonaphthalene is admixed with a commercial polypropylene in such proportions so that the finished composition of matter will contain 15% by weight of the polyhalo-substituted methanonaphthalene. The resulting mixture is milled at an elevated temperature and thereafter cut into strips. In addition, a strip of commercial polypropylene which does not contain the added methanonaphthalene is also added. The two strips are then subjected to a flammability test similar in nature to those hereinbefore described. The results of these tests will show that the novel composition of matter of the present invention, namely, a mixture of polypropylene and 1,2,3,4,9,9-hexachloro-6,7-dibromo-1,4,4a,5,6,7,8,8a-octahydro-1,4-methanonaphthalene will possess an oxygen index greatly in excess over the oxygen index of 0.180 which is possessed by the untreated polypropylene and in addition the novel composition of matter will not darken or change color over an extended period of time. This is in contradistinction to a commercial polypropylene which is treated with brominated polyethylene. This composition of matter will darken in color when alllowed to stand for an extended period of time.

EXAMPLE V

A mixture of 125 grams of 1,4-cycloheptadiene and 385 grams of hexachlorocyclopentadiene is refluxed for a period of 15 minutes while maintaining the temperature at about 65° C. by means of an ice bath. At the end of this time, the ice bath is removed and the temperature allowed to rise for an additional 15-minute period. At the end of the total time of 30 minutes, the solid is dissolved in 250 cc. of hot hexane, removed from the reactor, cooled and the resulting solid is filtered for removal from the hexane. The solid is vacuum dried and thereafter treated with elemental bromine, said bromine being added slowly during a period of 1 hour while maintaining the temperature of the reaction at about 40° C. The desired product, which comprises 1,2,3,4,10,10-hexachloro-6,7-dibromo-1,4,4a,9a-tetrahydro-1,4-methano-1H-benzocycloheptane is recovered and admixed with a commercial acrylonitrile-butadiene-styrene copolymer in such an amount so that the finished composition of matter will contain 15% of the polyhalo-substituted benzocycloheptane. The mixture is milled at an elevated temperature and cut into strips suitable for being subjected to a flammability test. In addition, another set of strips is prepared which contains only the commercial acrylonitrile-butadiene-styrene copolymer. After subjecting the two sets of strips to flammability tests similar to that hereinbefore described it will be found that the oxygen index which is possessed by the novel composition of matter of the present invention will be greatly in excess over the oxygen index which is possessed by the strip of untreated acrylonitrile-butadiene-styrene copolymer. In addition, the novel composition of matter will also possess a rate of burning as measured in seconds per inch much slower than that of the untreated polymer strip.

We claim as our invention:

1. A novel flame retardant composition of matter comprising a polymeric material and a compound possessing the formula:

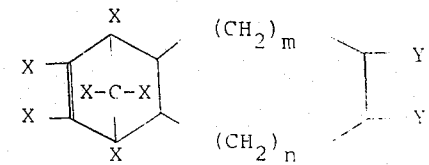

in which X is selected from the group consisting of hydrogen and halogen, at least two X's being halogen, Y is halogen, and $m$ and $n$ are an integer of from 1 to 2.

2. The composition of matter as set forth in claim 1 in which said halogen is chlorine.

3. The composition of matter as set forth in claim 1 in which said halogen is bromine.

4. The composition of matter as set forth in claim 1 in which said polymeric material is polypropylene and said compound is 1,2,3,4,9,9-hexachloro-6,7-dibromo-1,4,4a,5,6,7,8,8a-octahydro-1,4-methanonaphthalene.

5. The composition of matter as set forth in claim 1 in which said polymeric material is an acrylonitrile-butadiene-styrene copolymer and said compound is 1,-2,3,4,10,10-hexachloro-6,7-dibromo-1,4,4a,9a-tetrahydro-1,4-methano-1H-benzocycloheptane.

6. The composition of matter as set forth in claim 1 in which said polymeric material is polyethylene and said compound is 1,2,3,4,11,11-hexachloro-7,8-dibromo-1,4,4a,10a-tetrahydro-1,4-methanobenzocyclooctane.

7. The composition of matter as set forth in claim 1 in which said polymeric material is a polyester and said compound is 2,3-dibromo-4,5,6,7-tetrachloro-3a,4,7,7a-tetrahydro-4,7-methanoindane.

* * * * *

Disclaimer 3,888,820.—*Irving Touval*, Fords, and *Morris Dunkel*, Paramus, N.J. NOVEL FLAME RETARDANT COMPOSITIONS OF MATTER. Patent dated June 10, 1975. Disclaimer filed July 18, 1975, by the assignee, *Universal Oil Products Company*.

Hereby enters this disclaimer to claim 7 of said patent.

[*Official Gazette June 1, 1976.*]

Disclaimer 3,888,820.—*Irving Touval*, Fords, and *Morris Dunkel*, Paramus, N.J. NOVEL FLAME RETARDANT COMPOSITIONS OF MATTER. Patent dated June 10, 1975. Disclaimer filed June 16, 1977, by the assignee, *UOP Inc.*

Hereby enters this disclaimer to all claims of said patent.

[*Official Gazette August 16, 1977.*]